United States Patent Office 3,778,381
Patented Dec. 11, 1973

3,778,381
FLUOROCARBON MICROEMULSIONS
Henri L. Rosano, Oradell, N.J., and William E. Gerbacia, Bronx, N.Y., assignors to Allied Chemical Corporation, New York, N.Y.
No Drawing. Filed Apr. 24, 1972, Ser. No. 247,039
Int. Cl. B01j 13/00
U.S. Cl. 252—311　　　　　　　　　　　　23 Claims

ABSTRACT OF THE DISCLOSURE

Microemulsions of liquid fluorinated organic compounds having more than 4 carbon atoms are prepared by (1) admixing the fluorinated compound with a low boiling fluorohalocarbon which is either miscible with or a solvent for the fluorinated compound, (2) adding this mixture to an aqueous system containing a surfactant while stirring until a microemulsion is formed and (3) removing the fluorohalocarbon by evaporation. The microemulsion so produced are highly stable and are capable of absorbing a large amount of oxygen and carbon dioxide. As such they are useful in the preservation of animal organs.

---

This invention relates to microemulsions. More particularly this invention relates to microemulsions of fluorinated organic compounds in aqueous systems.

The capability of fluorinated organic compounds to absorb large amounts of oxygen and carbon dioxide, even more than whole blood and twenty times that of water, is a recognized characteristic of these compounds. Successful exploitation of this characteristic has been hindered by the fact that, like most other oils these compounds are not miscible with water. As a consequence, attempts at admixing such compounds with aqueous systems, especially the higher molecular weight fluorinated organic compounds, i.e., those have more than 4 carbon atoms, have resulted in the formation of emulsions which due to the large droplet size in the emulsion are relatively unstable with a corresponding short shelf life and, therefore, do not achieve their full potential as oxygen absorbents when employed, e.g., as a blood substitute in the preservation of animal organs.

Conventional emulsions, or macroemulsions, which are widely used, nearly always have droplet diameters above 1 micron and usually above 5 microns. In contrast to large droplets or macroemulsion, there is another type of emulsion termed microemulsion in which the droplets have a diameter of from about 0.01 micron to 0.1 micron. At these levels, microemulsions are on the borderline between solubilization and emulsification and, because the diameter is smaller than the wave length of light, these systems are transparent. The small droplet size of the microemulsions provide the benefit of greatly improved stability and gaseous absorption due to the increased interfacial area. Microemulsions of fluorinated organic compounds having more than 4 carbon atoms would therefore provide a stable composition having a high capability for absorption of oxygen resulting in its efficient and economical use as a whole blood substitute in the preservation of animal organs.

It is therefore an object of the present invention to provide a microemulsified composition comprising a fluorinated organic compound, having in excess of 4 carbon atoms, in an aqueous system.

It is a further object of this invention to provide a microemulsified composition having a high capability for absorption of oxygen.

It is a still further object of this invention to provide a microemulsified composition comprising a fluorinated organic compound, a surfactant and saline solution.

It is yet a further object of this invention to provide a process of preparing a microemulsion of a fluorinated organic compound, having greater than 4 carbon atoms, in an aqueous solution.

These and other objects will appear from the description which follows.

SUMMARY OF THE INVENTION

In accordance with this invention there is provided a microemulsion comprising droplets of a fluorinated organic compound dispersed throughout an aqueous system wherein the compound contains more than 4 carbon atoms and wherein the size of the dispersed droplets is in the range of between about 0.01 micron to about 0.1 micron. The microemulsion also will contain a surface active agent, or surfactant, which preferably has a fluorinated moiety. The aqueous system is preferably a salt solution, e.g., normal normal buffered saline. These emulsions are capable of absorbing a significant amount of oxygen and carbon dioxide and are particularly useful as a whole blood substitute in the preservation of animal organs.

The fluorinated organic compounds having more than 4 carbon atoms and which normally cannot be microemulsified, are microemulsified in accordance with this invention by admixing the compound with a fluorohalocarbon, having 4 or less carbon atoms and which is a solvent for, or miscible with the fluorinated organic compound. The mixture is then added to an aqueous system, e.g., normal saline or buffered saline along with a surfactant and the system is agitated until microemulsification occurs. The fluorohalocarbon, which has a boiling point of about 75° C. or below is then removed, usually by evaporation, leaving the fluorinated organic compound microemulsified in the aqueous system.

DETAILED DESCRIPTION OF THE INVENTION

Due to their ability to absorb oxygen and carbon dioxide, and to the fact that they are not bio-degradable, microemulsions of fluorinated organic compounds having more than 4 carbon atoms, preferably 5 to 30 carbon atoms, have desirable properties which make them useful for paper sizing, textile treating and especially, as a substitute for artificial blood in the preservation of animal organs. Heretofore it was not thought possible to produce microemulsions of these compounds since their solubility for the hydrophobic portion of ordinary surfactants is such that the proper interfacial tension for microemulsification cannot be obtained. These fluorinated organic compounds are preferably fluoroethers and, most preferably contain a perfluoroisopropoxy "tail." The liquid fluoro organic compounds which are microemulsifiable in accordance with this invention may be represented by the formula:

$$F-\underset{\underset{CFX_2}{|}}{\overset{\overset{CFX_2}{|}}{C}}-O-(CF_2CF_2)_n-(CH_2CH_2)_m-Y$$

wherein:

X is individually, at each occurrence is —F or —Cl,
Y is

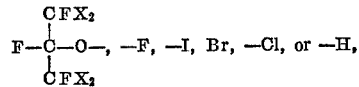
F—C—O—, —F, —I, Br, —Cl, or —H, $n$ is an integer of from 1 to 20 and $m$ is an integer of from 0 to 10 with the sum of $m$ and $n$ not exceeding 20.

Exemplary of compounds falling within this generic formula are:

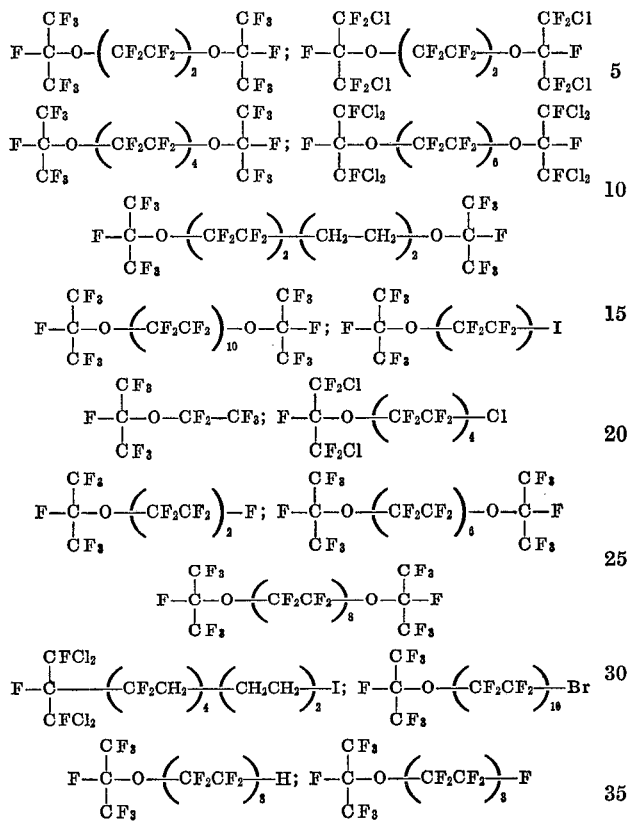

and other like compounds. The preferred compounds are those in which X is fluorine, $n$ is 2, 3 or 4, $m$ is 0 and Y is —F or

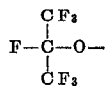

The microemulsions of this invention will contain up to 50 weight percent of the microemulsified fluorinated organic compound. Since it is this component which serves as the absorbent for oxygen and/or carbon dioxide, it is advantageous to have as much emulsified fluorinated compound as possible. Generally, the microemulsion should not contain less than 5 weight percent of the fluorinated compound.

It is pointed out above that these compounds are microemulsified by admixing same, in a ratio of between 0.75:1 and 1.25:1, with a fluorohalocarbon having 4 or less carbon atoms. The fluorohalocarbons must be removed from the emulsion since some of these compounds are considered toxic. To effect this desired removal, while leaving the fluorinated organic compound microemulsified, the fluorohalocarbon is allowed to evaporate, usually by gentle heating. Consequently, the fluorohalocarbon should have a boiling point below about 75° C. preferably below 50° C. in order to facilitate easy removal. Since the fluorohalocarbon is removed by evaporation, and further since it is desired to retain the fluorinated organic compound in the emulsified state, the fluorinated organic compound should have a boiling point at least 35° C. higher than the fluorohalocarbon.

Another important, and indeed necessary characteristic of the fluorohalocarbon employed is its ability either to act as a solvent for the fluorinated organic compound to be microemulsified or be miscible therewith. While it has been pointed out that fluorinated organic compounds having more than 4 carbon atoms do not microemulsify, the fluorohalocarbons are microemulsifiable with the aid of surfactants. In accordance with this invention it has been discovered that fluorinated organic compounds of the class described can be microemulsified by admixing them with a microemulsifiable fluorohalocarbon and further, that the fluorohalocarbon can be evaporated from the emulsion leaving the fluoroinated organic compound in a microemulsified state.

Within these guidelines exemplary of the fluorohalocarbons which are employed in the process of this invention are acyclic compounds of the general formula

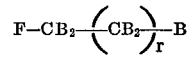

or cyclic compounds of the general formula

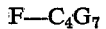

wherein B, individually, at each occurrence, is fluorine, chlorine, bromine, iodine or hydrogen, with the proviso that at least one B is other than hydrogen or fluorine, $r$ is an integer of 0 to 3 and G is fluorine, chlorine, bromine, iodine or hydrogen with the proviso that at least one G is other than hydrogen.

Exemplary of fluorohalocarbons falling within these generic formulae are:

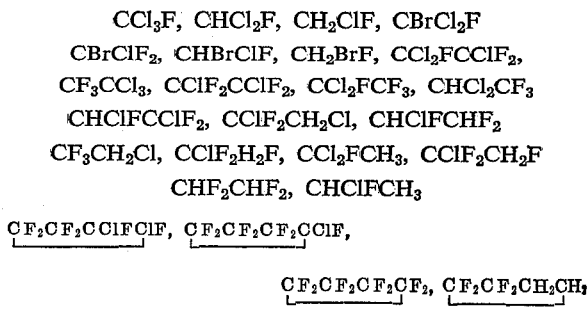

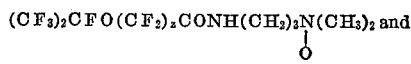

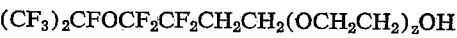

and other like compounds.

While surfactants, or mixtures of surfactants generally employed in the formation of oil-in-water or water-in-oil emulsions may be employed in producing the microemulsions of this invention, it is greatly preferred to utilize at least one surfactant having a perfluoroisopropoxy "tail". Surfactants, and mixtures of surfactants, employed in emulsion formation are well known to those skilled in the art, and in that sense they are not critical to the practice of the invention. For example, substituted and unsubstituted polyglycol ethers are well known for this application. Fluorinated surfactants are also known to the art and, while not absolutely necessary, it is greatly preferred, as above stated, to employ at least one such known fluorinated surfactant in forming the microemulsions of this invention. Suitable fluorinated surfactants that may be mentioned are fluorinated amine oxides of the formula $$(CF_3)_2CFO(CF_2)_zCONH(CH_2)_3\overset{\text{O}}{N}(CH_3)_2 \text{ and}$$

fluoroalcohols of the formula $$(CF_3)_2CFOCF_2CF_2CH_2CH_2(OCH_2CH_2)_zOH$$

wherein $z$ is an integer of from 2 to 20. It will be understood that other like surfactants may likewise be employed.

When the microemulsions of the present invention are to be employed as whole blood substitutes for the preservation of human organs the aqueous system portion thereof will ordinarily be normal buffered saline solution (i.e., a 0.9% solution of NaCl—NaHCO₃ at a pH of 7.2) and for this reason this is the preferred aqueous system. It will be understood, however, that other systems, e.g. water, other salt solutions, sugar solutions, etc., may likewise be employed as the aqueous system with which the fluorocarbon is microemulsified. The surfactants are employed in amounts between 25 and 120 weight percent of the fluorocarbon to be microemulsified.

DESCRIPTION OF PREFERRED EMBODIMENTS

The following examples are given by way of illustration only and are not to be considered as limiting in any manner.

Example I 1 ml. of a 1:1 mixture of α,ω-diperfluoroisopropoxy perfluorooctane and CCl$_2$FCClF$_2$ were added to 25 ml. of water containing 0.7 weight percent sodium chloride and 0.2 weight percent sodium bicarbonate (normal buffered saline) and, as surfactants, 1.45 grams of a fluorinated amine oxide of the formula

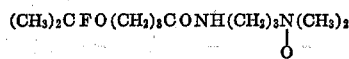

0.46 ml. of nonyl phenol polyethylene glycolether (M.W. 600); and 0.8 ml. of fluorinated alcohol of the formula

The mixture was gently stirred until microemulsion occurred spontaneously, i.e., the mixture became transparent. The microemulsion was then heated at 36° C., for 3 hours. The system remained transparent after this treatment even though the calculated time for removal of all of the CCl$_2$FCClF$_2$, if entirely exposed, at this temperature is 8 minutes. Ultracentrifugation of the mixture after heating resulted in a schlieren pattern which is indicative of microemulsification. Significant amounts, up to 1.1 cc. of oxygen, are absorbed by the microemulsion so formed, at one atmosphere of O$_2$ pressure.

Example II

The procedure set out in Example I was repeated with the exception that the fluorinated organic compound was

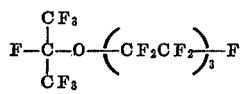

Again, a stable microemulsion was formed which was observed to absorb significant amounts of oxygen.

What is claimed is:

1. A composition of matter comprising a microemulsion of droplets of a fluorinated organic compound having the formula

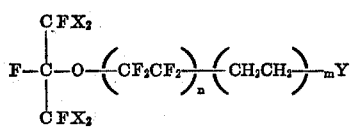

wherein X, individually, at each occurrence is fluorine or chlorine, Y is fluorine, chlorine, bromine, iodine, hydrogen or

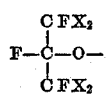

n is an integer of from 1 to 20, m is an integer of from 0 to 20 and the sum of n and m is not greater than 20, said fluorinated organic compound being dispersed throughout an aqueous system and wherein the size of the dispersed droplets is between about 0.01 and about 0.1 micron.

2. A composition as defined in claim 1 wherein a fluorinated surfactant is present in the microemulsion.

3. A composition as defined in claim 1 wherein the fluorocarbon is present in an amount of between 5 and 50 weight percent of the microemulsion.

4. A composition as defined in claim 1 wherein a fluorinated surfactant is present in the microemulsion.

5. A composition as defined in claim 4 wherein the surfactant is present in an amount of between 25 and 120 weight percent of the fluorinated organic compound.

6. A composition as defined in claim 1 wherein the aqueous system is a salt solution.

7. A composition as defined in claim 6 wherein the salt solution comprises a buffered solution of sodium chloride in water.

8. A composition as defined in claim 1 wherein 5 is fluorine, n is 2, m is 0 and Y is

9. A composition as defined in claim 1 wherein X is fluorine, n is 4, m is 0 and Y is

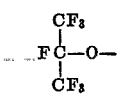

10. A composition as defined in claim 1 wherein X is fluorine, n is 3, m is 0 and Y is F.

11. A process for forming a microemulsion of a fluorinated organic compound having more than 4 carbon atoms which comprises admixing said compound with a fluorohalocarbon having 4 or less carbon atoms, a boiling point below about 75° C. and which is a solvent for, or miscible with the fluorinated organic compound, adding the mixture so formed to an aqueous system containing a surfactant, agitating the system until it becomes transparent and thereafter removing the fluorohalocarbon by evaporation.

12. A process as defined in claim 11 wherein the fluorinated organic compound has between 5 and 30 carbon atoms.

13. A process as defined in claim 11 wherein the weight ratio of the fluorinated organic compound to the fluorohalocarbon is between 1.25:1 and 0.75:1.

14. A process as defined in claim 11 wherein the surfactant is present in the aqueous system in an amount of between 25 and 120 weight percent of the fluorinated organic compound.

15. A process as defined in claim 11 wherein the fluorinated organic compound has the formula

wherein X, individually at each occurence is fluorine or chlorine, Y is fluorine, chlorine, bromine, iodine, hydrogen or

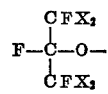

n is an integer of from 1 to 20, m is an integer of from 0 to 10 and the sum of n and m does not exceed 20.

16. A process as defined in claim 15 wherein the fluorohalocarbon is an acyclic compound of the formula

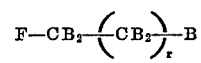

or a cyclic compound of the formula

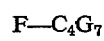

wherein B, individually at each occurence is fluorine, chlorine, bromine, iodine or hydrogen, with the proviso that at least one B is other than hydrogen or fluorine, r is an integer of from 0 to 3 and G is fluorine, chlorine, bromine, iodine or hydrogen with the proviso that at least one G is other than hydrogen.

17. A process as defined in claim 16 wherein the aqueous system is a salt solution.

18. A process as defined in claim 17 wherein the aqueous system comprises a buffered solution of sodium chloride in water.

19. A process as defined in claim 16 wherein the surfactant comprises a fluorinated compound.

20. A process as defined in claim 15 wherein X is fluorine, $n$ is 2, $m$ is 0 and Y is

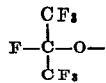

21. A process as defined in claim 15 wherein X is fluorine, $n$ is 3, $m$ is 0 and Y is —F.

22. A process as defined in claim 15 wherein X is fluorine, $n$ is 4, $m$ is 0 and Y is

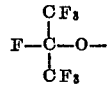

23. A process as defined in claim 22 wherein the fluorohalo compound is $CCl_2FCClF_2$.

References Cited
UNITED STATES PATENTS

| | | | |
|---|---|---|---|
| 2,971,028 | 2/1961 | Gray | 252—312 |
| 3,630,951 | 12/1971 | Netherly | 252—307 |
| 3,661,776 | 5/1972 | Fletcher et al. | 252—307 |

JOHN D. WELSH, Primary Examiner

U.S. Cl. X.R.

424—342, 194; 252—312

UNITED STATES PATENT OFFICE
CERTIFICATE OF CORRECTION

Patent No. 3,778,381  Dated December 11, 1973

Inventor(s) Henri L. Rosano and William E. Gerbacia

It is certified that error appears in the above-identified patent and that said Letters Patent are hereby corrected as shown below:

Col. 2, line 18 - "normal normal buffered" should read -- normal buffered --;

Col. 2, line 61 - "wherein:" should read -- wherein, --;

Col. 4, line 30, that part which reads "$CClF_2H_2F$," should read -- $CClF_2CH_2F$, --;

Col. 4, line 34, that part which reads "$\underline{CF_2CF_2CClF}ClF$," should read -- $\underline{CF_2CF_2CClFC}$ $ClF$ --;

Col. 4, line 5 - "fluoroinated" should read -- fluorinated --;

Col. 4, line 57 - "$(CF_3)_2CFO(CF_2)_zCONH(CH_2)_3\underset{O}{N}(CH_3)_2$"

should read

-- $(CF_3)_2CFO(CF_2)_zCONH(CH_2)_3\underset{O}{\overset{\downarrow}{N}}(CH_3)_2$ --;

UNITED STATES PATENT OFFICE
CERTIFICATE OF CORRECTION

Patent No. 3,778,381            Dated December 11, 1973

Inventor(s) Henri L. Rosano and William E. Gerbacia

It is certified that error appears in the above-identified patent and that said Letters Patent are hereby corrected as shown below:

Col. 5, first formula $-"(CH_3)_2CFO(CH_2)_3CONH(CH_2)_3\overset{\downarrow}{N}(CH_3)_2"$
$$O$$

should read $-- (CF_3)_2CFO(CF_2)_3CONH(CH_2)_3\overset{\downarrow}{N}(CH_3)_2; --;$
$$O$$

Col. 5, fourth formula, that part which reads "$(CH_2CH_2)\ mY$"

should read $-- (CH_2CH_2\overset{\rightarrow}{)}_m Y --;$

Col. 6, line 4 - "wherein 5" should read -- wherein X --.

Signed and sealed this 16th day of April 1974.

(SEAL)
Attest:

EDWARD M. FLETCHER, JR.         C. MARSHALL DANN
Attesting Officer                   Commissioner of Patents